United States Patent
Peter et al.

(10) Patent No.: US 7,333,245 B2
(45) Date of Patent: Feb. 19, 2008

(54) SYSTEM AND METHOD FOR PRINTING RETAINED PRINT JOBS

(75) Inventors: Gary M. Peter, Boise, ID (US); Matt Howell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 09/906,958

(22) Filed: Jul. 16, 2001

(65) Prior Publication Data

US 2003/0011804 A1 Jan. 16, 2003

(51) Int. Cl.
- G06F 3/12 (2006.01)
- G06F 15/78 (2006.01)
- G06F 15/167 (2006.01)
- G06K 1/00 (2006.01)
- H04N 1/64 (2006.01)
- H04N 1/32 (2006.01)
- H04N 1/21 (2006.01)

(52) U.S. Cl. ............. 358/403; 358/1.15; 358/1.16; 358/426.12; 358/435; 358/407

(58) Field of Classification Search ............ 358/1.15, 358/438, 1.16, 296, 403, 425; 399/8
See application file for complete search history.

(56) References Cited

U.S. PATENT DOCUMENTS

| | | | |
|---|---|---|---|
| 4,731,672 A * | 3/1988 | Sugishima et al. ......... 358/296 |
| 4,994,926 A * | 2/1991 | Gordon et al. ............. 358/400 |
| 5,130,806 A * | 7/1992 | Reed et al. ................ 358/296 |
| 5,220,674 A * | 6/1993 | Morgan et al. ............ 709/223 |
| 5,638,511 A * | 6/1997 | Nezu ......................... 713/201 |
| 5,764,863 A    | 6/1998 | Fall et al. .................. 395/112 |
| 5,815,280 A * | 9/1998 | Ohmura et al. ............ 358/296 |
| 5,873,659 A * | 2/1999 | Edwards et al. ............. 400/61 |
| 6,160,629 A    | 12/2000 | Tang et al. ................. 358/1.1 |
| 6,160,638 A * | 12/2000 | Yasuda ...................... 358/438 |
| 6,751,732 B2 * | 6/2004 | Strobel et al. ............. 713/176 |
| 6,864,992 B1 * | 3/2005 | Okada ....................... 358/1.15 |
| 7,113,300 B2 * | 9/2006 | Strobel et al. ............ 358/1.15 |
| 7,123,371 B1 * | 10/2006 | Yoda et al. ............... 358/1.15 |
| 2001/0019425 A1 * | 9/2001 | Yamashita ................ 358/1.15 |
| 2001/0038462 A1 | 11/2001 | Teeuwen |
| 2002/0135797 A1 * | 9/2002 | Al-Kazily et al. ......... 358/1.15 |
| 2003/0011803 A1 * | 1/2003 | Peter et al. ................ 358/1.14 |
| 2003/0011813 A1 * | 1/2003 | Peter et al. ................ 358/1.15 |
| 2003/0076526 A1 * | 4/2003 | Gopalan ..................... 358/1.15 |
| 2005/0289116 A1 * | 12/2005 | Chae et al. .................... 707/2 |

FOREIGN PATENT DOCUMENTS

EP 1069741 A1 * 1/2001

* cited by examiner

Primary Examiner—Twyler Lamb
Assistant Examiner—Myles D. Robinson

(57) ABSTRACT

A computing system including a computer and a printer. The computer is operable to transmit a print job to the printer that cases the printer to retain the job. The computer is further operable to record a record of the job. The record includes an identifier of the job and an identifier of the printer. The user can later retrieve and display the job ID and request that the job be printed. The computer responds by causing the printer to print the job.

9 Claims, 3 Drawing Sheets

SYSTEM AND METHOD FOR PRINTING RETAINED PRINT JOBS

BACKGROUND OF THE INVENTION

Today, many printing devices includes "Job retention printing capability". A detailed explanation of job retention printing is described by the patent entitled "Multiple copy printer with print job retention", U.S. Pat. No. 6,160,629. That patent is incorporated herein by reference.

Job retention, generally, refers to a printer's ability to store a received print job locally in the printer's local storage device (e.g., the printer's local disk drive). The print job is printed when certain conditions are met. There are a several types of retention printing.

A first type of retention printing is commonly referred to as "quick copy printing". According to quick copy printing, a printer stores a received multi-copy print job and prints the copies. Thereafter, a walk-up user can cause additional copies to be printed by interacting with the printer's control panel.

A second type of retention printing is commonly referred to as "Proof and Hold" printing. According to "Proof and Hold" printing, a printer stores a received multi-copy print job and prints a limited number of copies (typically one copy). Thereafter, a walk-up user can cause the rest of the copies to be printed by "releasing them" from the printer's control panel.

A third type of retention printing is commonly referred to as "private" printing. According to private printing, a printer stores a received print job and delays printing until a privacy code is entered by a walk-up user at the printer's control panel.

A fourth type of retention printing is commonly referred to as "simple retention" printing. According to simple retention printing, a received print job is simply stored and not printed. Future printing of the job is then available to walk up users via the printer's control panel In each of the four types of retention printing mentioned above, it is the user that originally sent the print job that is typically also the "walk-up user". In many situations, this can be inconvenient to the user and cost the user valuable time. Accordingly, there is a need for an easier way to allow the user to print a retained print job.

SUMMARY OF THE INVENTION

The present invention may be implemented, for example, as a method of printing. The method may include transmitting a retention job to a first printer. The first printer being responsive to the retention job by retaining the retention job. The method may further include automatically generating a record of the retained job, the record including an identifier of the retained job and an identifier of the printer; then using the record to identify the retained retention job, and causing the retained job to be printed.

The present invention may also be implemented, for example, as a computer. The computer including apparatus for transmitting a retention job to a first printer that is responsive to the retention job, at least in part, by retaining the retention job. The computer further includes apparatus for recording an identifier of the retained job and an identifier of the first printer and apparatus for displaying the recorded identifier.

The present invention may also be implemented, for example, as a computer readable medium embodying a program of instructions embodying a program of instructions executable by the computer to perform method steps. The method steps including asthmatically recording an identifier of a first print job and an identifier of a first printer retaining the print job and displaying the first print job identifier.

Other aspects and advantages of the present invention will become apparent from the following detailed description, taken in conjunction with the accompanying drawings, illustrating by way of example, the principles of the invention.

DETAILED DESCRIPTION OF THE INVENTION

For purposes of this application, a print job that invokes any of the four types of retention printing may generally be referred to herein as a "retention job". Thus, for example, a print job that invokes "quick copy" printing may be referred to as a "retention job".

Figure 1:
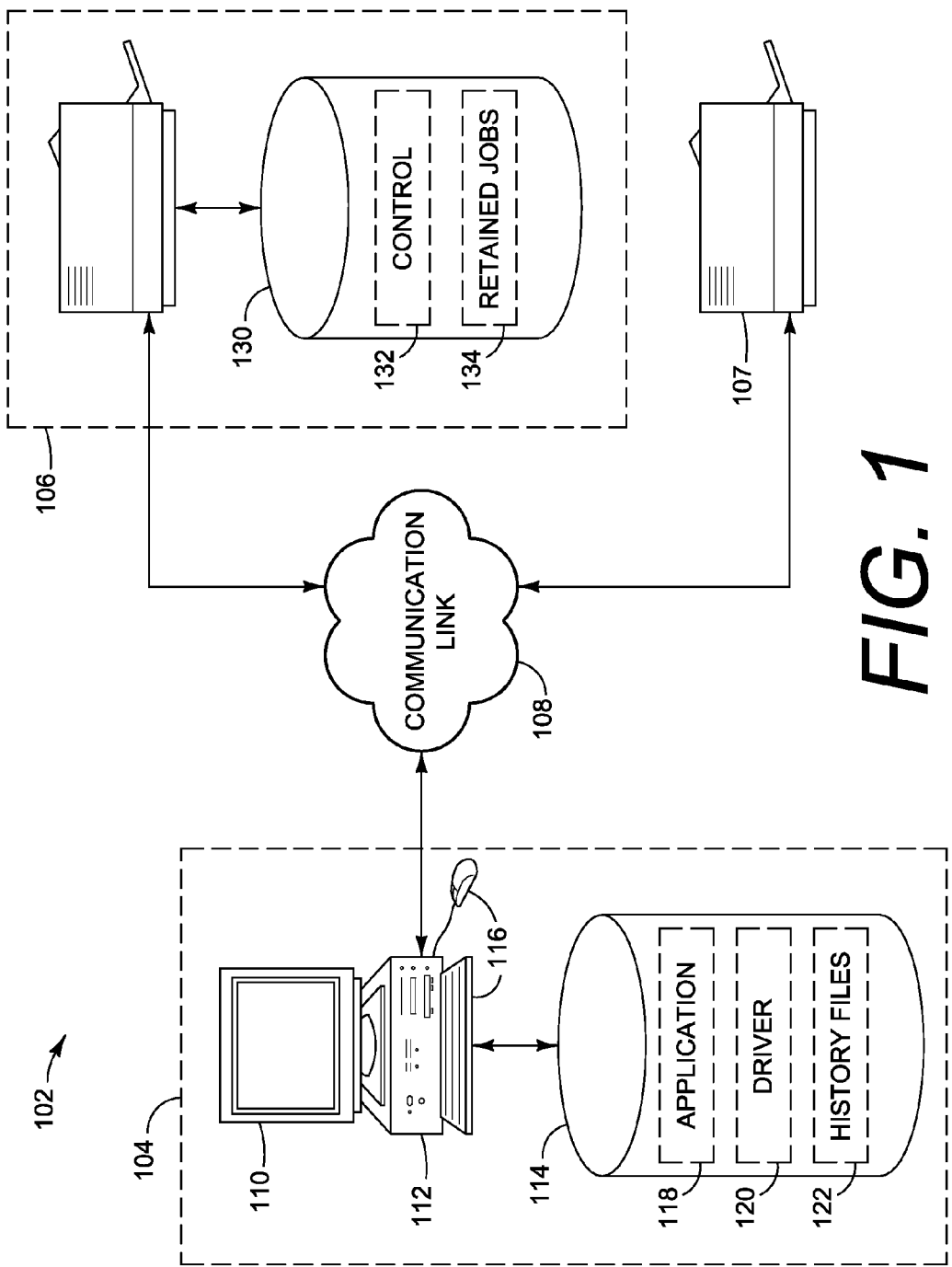
FIG. 1 is a block diagram of a computing system embodying the invention.

As shown in FIG. 1, for purposes of illustration, the invention is embodied in a novel computing system 102. The computing system 102 includes a computer 104 (e.g., a personal computer or personal workstation) and printers 106 and 107. The computer 104 can communicate print jobs to printers 106 and 107 over the communication link 108.

The communication link 108 may represent any type of communication path capable of enabling the transmission of a print job from one device to another. Thus, for example, the communication link 108 may represent a network (e.g., an Intranet of the INTERNET), an infrared link, radio frequency link, a parallel port, a serial port, etc.

In this embodiment, the computer 104 includes several conventional hardware components including a display monitor 110, a processing unit 112, a memory 114 and user input devices 116.

Stored in the memory 114 is a software application 118, a print driver 120 and a history file 122. The processing unit 112 can retrieve and then execute both the application 118 and the driver 120. The history file 122 is used to store a record of each retention job that was previously transmitted by the computer 104 to the printer 106.

The printer 106 includes a memory 130. Stored in the memory 130 is control firmware 132. The control firmware 132 enables the printer 106 to respond in an appropriate manner to a received retention job. A reserved area 134 of the memory 130 is used to store received retention jobs. It is noted for the later discussion, that the printer 106 is assigned an identifier (printer ID) that can be used by another device (e.g., the computer 102) to identify the printer over the communication link 108.

It is noted that the memory 114 and the memory 130 are shown as external units in FIG. 1. This is only for illustration purposes. In actual implementations, the memories may be located internally or externally. Alternatively, a portion of the memories shown may be located internally and a portion located externally.

The application program 118 may represent any conventional program (e.g., a conventional word processing application) that allows a user to generate a document in an electronic form. In this embodiment, the application 118 provides a print dialog box that allows a user to designate a printer (e.g., the printer 106) to print the document. Additionally, the print dialog box allows the user to select one of the four types of retention printing described above. That is, the user can select "quick-copy" printing, "proof and hold" printing, "private printing" or "simple retention printing".

In response to user input received via the print dialog box, the application 118 transmits appropriate commands to the driver 120 to cause the driver 120 to generate and transmit a print job.

Figure 2:
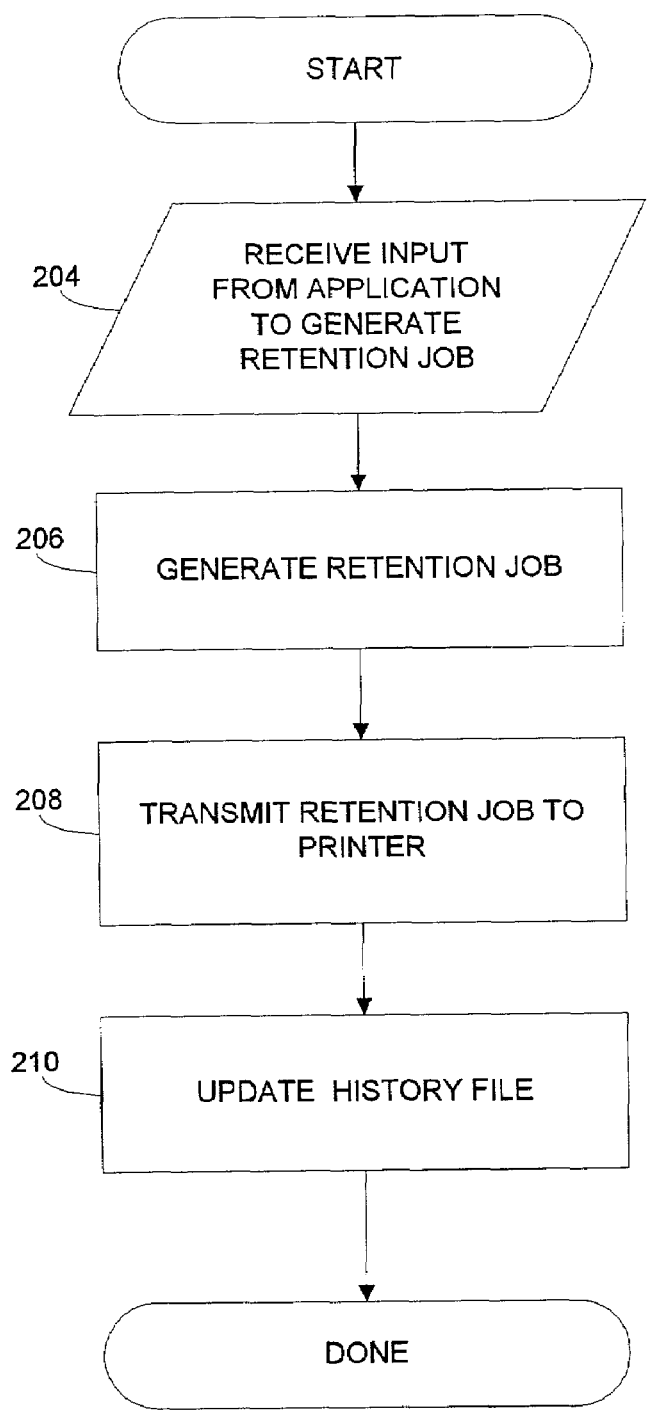
FIG. 2 is a flow diagram illustrating the operation of a print driver upon receiving such commands from an application.

FIG. 2 is a flow diagram illustrating the operation of the printer driver 120 to generate and transmit a print job. Turning now to FIG. 2, the driver 120 is assumed to receive a set of commands from the application 118 at step 204. For illustration purposes, it is assumed that the commands received at step 204 direct the driver 120 to generate a print job that invokes a particular type of retention printing (e.g., a quick copy printing). The commands also designate a printer (e.g., the printer 106) that is to receive the job.

The driver 120 responds by generating a retention job (step 206). The retention job is assigned an identifier (job ID) that can be used to identify the job. After the retention job is generated, it is then transmitted to the designated printer (e.g. the printer 106) (step 208). The job ID is included in the retention job.

Importantly, the driver 120 then automatically updates the history file by adding an entry (step 210). In this embodiment, the entry serves as a record of the just transmitted retention job. The entry includes the job ID assigned to the job that was just transmitted and the printer ID assigned to the printer that received the job. The entry may also include additional information. For example, the entry may indicate whether the retention job is a "quick copy retention job", a "proof and hold retention job", a "private printing retention job" or a "simple retention job". In addition, the entry may also indicate the date and time the job was transmitted.

In this example, the driver 120 can also cause the monitor 110 to display a dialog box that shows the entries in the history file 122. For ease of discussion, the dialog box will be referred to herein as the "retention job history dialog box".

Figure 3:
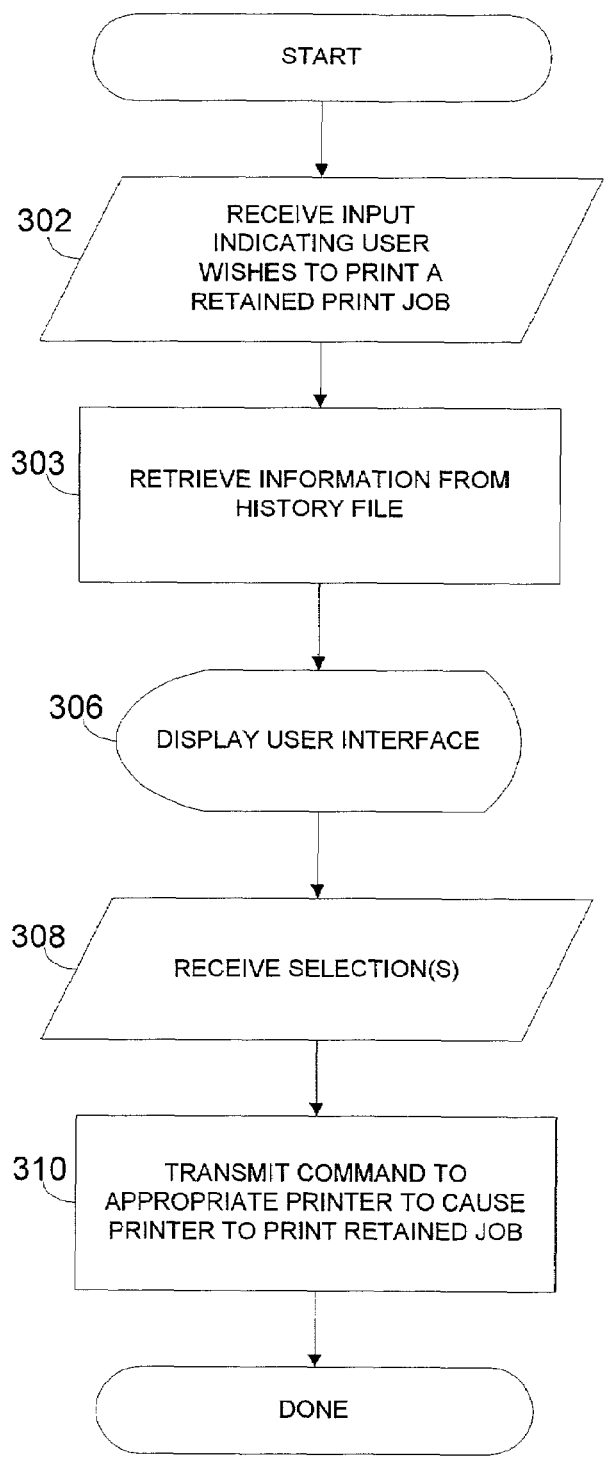
FIG. 3 is a flow diagram illustrating an aspect of the print driver's functionality.

FIG. 3 is a flow diagram illustrating this aspect of the driver's functionality. Turning now to FIG. 3, the driver is assumed to receive input from a user to invoke the retention job history dialog box (step 302). In response, the driver 120 operates to retrieve the entries from the history file 122 (Step 303) and to cause the monitor 110 to display the retention job history dialog box (step 306).

The job history dialog box displays at least some of the entries in the history file 122 (Step 306). For example, all the entries that correspond to retention jobs that were transmitted over some defined period of time may be displayed at step 306.

The user can then request a retention job be printed by selecting its corresponding entry. The driver 120 is assumed to receive this input at step (308). It is noted that in other implementations of the invention, the user may also enter a number of document copies he/she wishes to print. In addition, if the selected entry corresponds to a "private printing retention job", the user may be required to enter an appropriate PIN number.

In response to the user input received at step 308, the driver 120 operates to transmit one or more appropriate command(s) to the printer presently retaining the retention job. The printer is responsive to these commands by printing the retention job (step 310). That is to say, the printer responds to the commands by converting the retention job into a printed document.

For clarification purposes, lets now consider the following example. Assume that the computer 104 has transmitted a total of three retention jobs: retention job "A"; retention job "B" and retention Job "C". All these jobs were transmitted to the printer 106 and are presently being stored in the memory 130. By operation of the driver 120, the history file 122 includes an entry for each one of the three Jobs.

Now assume that the user provides input to cause the driver 120 to display the entries in the history file. In response 120 displays the three entries (within the retention job history dialog box).The user then requests that retention job C be printed by selecting the entry that corresponds to the retention job C. In response to this user input, the driver 120 transmits an appropriate command to the printer 106 to cause the printer 106 to print Job C. The printer 106, under the direction of the controller firmware 132, retrieves Job C from the memory 130 and prints it. That is to say, the printer 106 converts Job C into a printed document.

From the forgoing it will be appreciated that the invention provides a novel and advantageous way of printing retained jobs that is both convenient to the user and saves the user time.

It is noted that in other embodiments, the program that allows the printer to print a retained job may allow the user to cause a retrieve a retained print job from the printer retaining it and then transfer it to another printer. In this manner, the user can print previously transmitted retention jobs by using a any number of printers.

In the embodiments just described, the functionality provided by any one of the programs described may alternatively be provided in whole or in part by hardware components. For example, one or more of the steps illustrated in any of the flow diagrams could be performed by operation of an application specific integrated circuit having appropriate logic gates, a programmable gate array (s) (PGA) or a field programmable gate array (FPGA). It is understood that any of the steps depicted in these flow diagrams may be performed in a different sequence shown. In fact, some steps may be performed concurrently or with partial concurrence.

Furthermore, the present invention may be embodied in the form of a computer readable medium that has anyone of the programs described above embodied therein. For example, the memory 114 and the memory 130 may each be considered embodiments of the invention. Importantly, the phrase "computer readable medium" can refer to any medium that can contain, store or propagate computer readable code.

Although several specific embodiments of the invention have been described and illustrated, the invention is not to be limited to specific forms or arrangements of pans so described and illustrated. The invention is limited only by the claims and the equivalents thereof.

What is claimed is:

1. A method of printing, comprising:
   a computer transmitting a print job to a printer remote from the computer;
   the printer retaining the print job;
   the computer storing, at a location remote from the printer, a record of the print job including an identifier of the print job and an identifier of the printer retaining the print job;

the computer using the record to identify the print job and the printer retaining the print job; and the computer causing the printer to print the print job.

2. The method of claim 1, wherein the printer comprises a first printer and printing the print job using the stored record comprises:

the computer using the record to identify the print job retained by the first printer;

the computer retrieving the print job retained by the first printer from the first printer; and the computer transmitting the print job retrieved from the first printer to a second printer and causing the second printer to print the print job.

3. The method of claim 1, further comprising the computer displaying the record and receiving, based on the record display, a selection to print the print job, and wherein the computer causing the printer to print the print job comprises the computer causing the printer to print the print job in response to the computer receiving the selection.

4. A printer driver embodied in a tangible computer readable medium residing on a single computer, the printer driver configured to:

receive input from an application program to generate a retention print job;

generate the retention print job in response to receiving the input;

assign an identifier to the retention print job;

transmit the retention print job to a printer;

save the identifier; and then receive input to print the retained print job based on the saved identifier; and transmit a command to a printer to print the retained print job.

5. The printer driver of claim 4 further configured to transmit the retention print job to a first printer and transmit a command to a second printer to print the print job retained by the first printer.

6. The printer driver of claim 4 further configured to display the identifier and receive the in put to print the retained print job in response to the display of the identifier.

7. A tangible computer readable medium having computer executable instructions thereon for:

a computer transmitting a print job to a printer remote from the computer;

the printer retaining the print job;

the computer storing, at a location remote from the printer, a record of the print job including an identifier of the print job and an identifier of the printer retaining the print job;

the computer using the record to identify the print job and the printer retaining the print job; and the computer causing the printer to print the print.

8. The computer readable medium of claim 7, wherein the printer comprises a first printer and the instructions for printing the print job using the stored record comprise instructions for:

the computer using the record to identify the print job retained by the first printer;

the computer retrieving the print job retained by the first printer from the first printer; and the computer transmitting the print job retrieved from the first printer to a second printer and causing the second printer to print the print job.

9. The computer readable medium of claim 7, further comprising instructions for the computer displaying the record and receiving, based on the record display, a selection to print the print job, and wherein the instructions for the computer causing the printer to print the print job comprise instructions for the computer causing the printer to print the print job in response to the computer receiving the selection.

* * * * *

UNITED STATES PATENT AND TRADEMARK OFFICE
CERTIFICATE OF CORRECTION

| | |
|---|---|
| PATENT NO. | : 7,333,245 B2 |
| APPLICATION NO. | : 09/906958 |
| DATED | : February 19, 2008 |
| INVENTOR(S) | : Gary M. Peter et al. |

It is certified that error appears in the above-identified patent and that said Letters Patent is hereby corrected as shown below:

In column 4, line 55, delete "pans" and insert -- parts --, therefor.

In column 6, line 2, in Claim 6, delete "in put" and insert -- input --, therefor.

Signed and Sealed this

Nineteenth Day of August, 2008

JON W. DUDAS
*Director of the United States Patent and Trademark Office*